United States Patent
Watkins et al.

(10) Patent No.: US 9,802,343 B2
(45) Date of Patent: Oct. 31, 2017

(54) PROCESS FOR FOAMING THERMOPLASTIC ELASTOMERS

(71) Applicant: NIKE, Inc., Beaverton, OR (US)

(72) Inventors: Richard L. Watkins, Portland, OR (US); Hossein Baghdadi, Portland, OR (US); Charles Edwards, Portland, OR (US); Yihua Chang, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/170,701

(22) Filed: Jun. 1, 2016

(65) Prior Publication Data

US 2016/0271847 A1    Sep. 22, 2016

Related U.S. Application Data

(62) Division of application No. 13/839,054, filed on Mar. 15, 2013, now Pat. No. 9,375,866.

(51) Int. Cl.
| | | |
|---|---|---|
| *B29C 44/34* | (2006.01) | |
| *A43B 13/04* | (2006.01) | |
| *B29D 35/12* | (2010.01) | |
| *B29D 35/00* | (2010.01) | |
| *C08J 9/12* | (2006.01) | |
| *C08J 9/18* | (2006.01) | |
| *C08J 9/232* | (2006.01) | |
| *A43B 13/12* | (2006.01) | |

(52) U.S. Cl.
CPC .......... *B29C 44/3415* (2013.01); *A43B 13/04* (2013.01); *A43B 13/125* (2013.01); *B29D 35/0054* (2013.01); *B29D 35/122* (2013.01); *C08J 9/122* (2013.01); *C08J 9/18* (2013.01); *C08J 9/232* (2013.01); *C08J 2203/06* (2013.01); *C08J 2203/08* (2013.01); *C08J 2300/22* (2013.01); *C08J 2300/26* (2013.01); *C08J 2375/04* (2013.01); *Y10T 428/249981* (2015.04)

(58) Field of Classification Search
None
See application file for complete search history.

(56) References Cited

U.S. PATENT DOCUMENTS

| | | | |
|---|---|---|---|
| 4,984,376 A * | 1/1991 | Walter | A43B 13/141 36/114 |
| 5,202,069 A * | 4/1993 | Pontiff | B29C 44/5627 264/276 |
| 5,670,102 A | 9/1997 | Perman et al. | |
| 6,598,252 B2 | 7/2003 | Woerlee | |
| 6,620,211 B2 | 9/2003 | Veugelers et al. | |
| 6,878,753 B1 | 4/2005 | Takemura et al. | |
| 7,731,763 B2 | 6/2010 | Cid et al. | |
| 7,861,733 B2 | 1/2011 | Pellikaan et al. | |
| 7,938,865 B2 | 5/2011 | Cid et al. | |
| 2002/0045040 A1 | 4/2002 | Kanada et al. | |
| 2004/0041292 A1 | 3/2004 | Chen et al. | |
| 2004/0162358 A1 | 8/2004 | Yamamoto et al. | |
| 2005/0049322 A1 | 3/2005 | Kanada et al. | |
| 2006/0199872 A1* | 9/2006 | Prieto | C08J 9/00 521/142 |
| 2008/0005856 A1 | 1/2008 | Hung | |
| 2010/0178488 A1 | 7/2010 | Yasuda et al. | |
| 2010/0222442 A1 | 9/2010 | Prissok et al. | |
| 2011/0138547 A1 | 6/2011 | Pemandez Cid et al. | |
| 2011/0232135 A1 | 9/2011 | Dean et al. | |
| 2011/0275732 A1 | 11/2011 | Bruchmann et al. | |
| 2012/0233877 A1* | 9/2012 | Swigart | A43B 7/223 36/28 |
| 2012/0302655 A1 | 11/2012 | Kanada et al. | |
| 2013/0017391 A1 | 1/2013 | Kato et al. | |

FOREIGN PATENT DOCUMENTS

| | | |
|---|---|---|
| WO | 9420568 | 9/1994 |
| WO | 1999/063019 | 12/1999 |
| WO | 2012/103451 | 8/2012 |
| WO | 2012/103451 A2 | 8/2012 |

OTHER PUBLICATIONS

Office Action issued by Korean Intellectual Property Office for Korean Patent Application No. 10-2015-7029751, dated Jan. 10, 2017, including English translation (14 pages).

Written Opinion and International Search Report PCT/US2014/022285 dated Aug. 1, 2014.

* cited by examiner

*Primary Examiner* — Stella Yi

(74) *Attorney, Agent, or Firm* — Thomas | Horstemeyer, LLP

(57) ABSTRACT

A foamed article is made by infusing the article of thermoplastic elastomer with a supercritical fluid, then removing the article from the supercritical fluid and either (i) immersing the article in a heated fluid or (ii) irradiating the article with infrared or microwave radiation.

19 Claims, No Drawings

PROCESS FOR FOAMING THERMOPLASTIC ELASTOMERS

CROSS-REFERENCE TO RELATED APPLICATIONS

This application is a divisional of U.S. patent application Ser. No. 13/839,054, filed Mar. 15, 2013, which is hereby incorporated herein by reference in its entirety.

FIELD OF THE INVENTION

The invention is related to methods of making foams and elastomeric foams.

INTRODUCTION TO THE DISCLOSURE

This section provides background information related to this disclosure but which may or may not be prior art.

Polyurethane foams are typically prepared by using chemically acting blowing agents or physically acting blowing agents that are mixed into or injected into the monomer reactants during polymerization. Chemical blowing agents include compounds that form gaseous products by reaction with isocyanate, for example water or formic acid, while physical blowing agents are dissolved or emulsified in the monomers and vaporize under the conditions of polyurethane formation. These are, for example, hydrocarbons and halogenated hydrocarbons or gases such as carbon dioxide, which are introduced either on-line, i.e. directly into the mixing head, or via the stock tank in batch operation. Such a process is described, for instance, in Bruchmann et al., US Patent Application Publication No. US 2011/0275732.

Takemura et al., U.S. Pat. No. 6,878,753 describes shoe soles and midsoles made of a thermoset polyurethane foam. The foam is made by a process comprising mixing a polyol solution, which is previously prepared by mixing a polyol, with a catalyst; water and urea, a chain extender, and an additive as occasion demands, with a polyisocyanate compound with stirring in a molding machine; and injecting the resulting mixture into a mold and foaming the mixture. The density of a molded article of the polyurethane foam is said to be 0.15 to 0.45 g/cm$^3$.

Fischer et al., WO 94/20568, describes thermoplastic polyurethane mini-pellet or bead foams with an average diameter of 1-20 millimeters. The polyurethanes are polyester- and polyether-based materials. The bead foams are molded under pressure and heated by introducing pressurized steam.

Prissok et al, US Patent Application Publication No. 2010/0047550 describes a hybrid material with a matrix of polyurethane and foamed particles of thermoplastic polyurethane embedded in the matrix. The hybrid material may be used for making shoe soles. The matrix polyurethane may be foamed during molding.

Prissok et al., US Patent Application Publication No. 2010/0222442 describes an expandable thermoplastic polyurethane including a blowing agent and having a Shore hardness of A 44 to A 84. Foams can be produced from expanded beads of the polyurethane by fusing them to one another in a closed mold with exposure to heat. Prissok et al. teach that the beads are charged to the mold, the mold is closed, and steam or hot air is introduced into the mold to further expand the beads and fuse them together. A foam made in this way is said to have a density in the range of from 8 to 600 g/L.

Nadella, US Patent Application Publication No. US 2010/0052201 describes making foamed polymeric panels from solid monolithic semi-crystalline thermoplastic material sheets, such as polylactic acid, polyethylene terephthalate, polyethylene naphthalate, polybutylene terephthalate, polypropylene, and polyethylene. The disclosed applies to film-type materials.

A need remains for improved methods of forming foams that can be customized for cushioning in footwear, protective wear, and similar applications.

SUMMARY OF THE DISCLOSURE

This section provides a general summary of what this specification discloses.

In a disclosed method, an article of a thermoplastic elastomer having at least one thin dimension (e.g., a thickness or width of about 10 mm or less) is infused with a supercritical fluid in a pressurized container, then rapidly depressurized and heated either by immersion in a heated fluid that can rapidly heat the article or with infrared or microwave radiation to heat and foam the article.

The foamed article may then be used to make a molded product. In various embodiments, the article that is foamed is a pellet, bead, particle, a tape, a ribbon, a rope, a film, a strand, or a fiber.

In a further aspect, the foamed article may be annealed at a temperature that allows equilibration after foaming to allow increased modulus to develop which helps maintain shape; the annealing is preferably performed immediately after it is foamed (i.e., before it is cooled significantly).

In a further aspect, the supercritical fluid comprises a polar liquid to adjust its Hildebrand solubility parameter to be nearer to that of the thermoplastic elastomer.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges are to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items.

DETAILED DESCRIPTION

This section provides specific examples intended to illustrate the invention that are not necessarily limiting as to materials and processes.

An article of a thermoplastic elastomer, preferably having at least one thin dimension (e.g., a thickness or width of about 10 mm or less, preferably 5 mm or less), is infused with a supercritical fluid in a pressurized container, then rapidly depressurized and heated either by immersion in a heated fluid or with infrared or microwave radiation to foam the article.

The article that is foamed may have a regular or irregular shape and may be, for example, a pellet, bead, particle, cylinder, prolate obloid, cube, sphere, pyramid, tape, ribbon, rope, film, strand, or fiber. Pellets, beads, or particles may be generally spherical, cylindrical ellipsoidal, cubic, rectangular, and other generally polyhedral shapes as well as irregular or other shapes, including those having circular, elliptical, square, rectangular or other polygonal cross-sectional outer perimeter shapes or irregular cross-sectional shapes with or without uniform widths or diameters along an axis. "Generally" is used here to indicate an overall shape that may have imperfections and irregularities, such as bumps, dents, imperfectly aligned edges, corners, or sides, and so on.

The article is a thermoplastic elastomer. Nonlimiting examples of suitable thermoplastic elastomers include thermoplastic polyurethane elastomers, thermoplastic polyurea elastomers, thermoplastic polyamide elastomers (PEBA or polyether block polyamides), thermoplastic polyester elastomers, metallocene-catalyzed block copolymers of ethylene and $\alpha$-olefins having 4 to about 8 carbon atoms, and styrene block copolymer elastomers such as poly(styrene-butadiene-styrene), poly(styrene-ethylene-co-butylene-styrene), and poly(styrene-isoprene-styrene).

Thermoplastic polyurethane elastomers may be selected from thermoplastic polyester-polyurethanes, polyether-polyurethanes, and polycarbonate-polyurethanes, including, without limitation, polyurethanes polymerized using as polymeric diol reactants polyethers and polyesters including polycaprolactone polyesters. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups reactive with isocyanate groups, such as the diols, amino alcohols, and diamines. Preferably the polymeric diol-based polyurethane is substantially linear (i.e., substantially all of the reactants are difunctional).

Diisocyanates used in making the polyurethane elastomers may be aromatic or aliphatic. Useful diisocyanate compounds used to prepare thermoplastic polyurethanes include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and xylylene diisocyanate (XDI), and combinations of these. Nonlimiting examples of higher-functionality polyisocyanates that may be used in limited amounts to produce branched thermoplastic polyurethanes (optionally along with monofunctional alcohols or monofunctional isocyanates) include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, allophanates of diisocyanates, and the like.

Nonlimiting examples of suitable diols that may be used as extenders include ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, dihydroxyalkylated aromatic compounds such as the bis (2-hydroxyethyl) ethers of hydroquinone and resorcinol; p-xylene-$\alpha,\alpha'$-diol; the bis (2-hydroxyethyl) ether of p-xylene-$\alpha,\alpha'$-diol; m-xylene-$\alpha,\alpha'$-diol and combinations of these. Thermoplastic polyurethanes may be made using small amounts of triols or higher functionality polyols, such as trimethylolpropane or pentaerythritol, optionally along with monomeric alcohols such as C2-C8 monools or monoisocyanates such as butyl isocyanate.

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from about 60 to about 400. Alcohols and amines are preferred. Examples of useful diols include those diols already mentioned. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these. The dithiol and diamine reactants may also be included in preparing polyurethanes that are not elastomeric.

In addition to difunctional extenders, a small amount of a trifunctional extender such as trimethylolpropane, 1,2,6-hexanetriol and glycerol, or monofunctional active hydrogen compounds such as butanol or dimethyl amine, may also be present. The amount of trifunctional extender or monofunctional compound employed may be, for example, 5.0 equivalent percent or less based on the total weight of the reaction product and active hydrogen containing groups used.

The polyester diols used in forming a thermoplastic polyurethane elastomer are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials (perhaps up to 5 mole percent) can be included to provide a slightly branched, but uncrosslinked polyester polyol component. Suitable dicarboxylic acids include, without limitation, glutaric acid, succinic acid, malonic acid, oxalic acid, phthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. In preferred embodiments, the carboxylic acid component includes one or more of adipic acid, suberic acid, azelaic acid, phthalic acid, dodecanedioic acid, or maleic acid (or the anhydrides or polymerizable esters of these) and the diol component includes one or more of includes 1,4-butanediol, 1,6-hexanediol, 2,3-butanediol, or diethylene glycol. Typical catalysts for the esterification polymerization are protonic acids, Lewis acids, titanium alkoxides, and dialkyltin oxides.

A polymeric polyether or polycaprolactone diol reactant for preparing thermoplastic polyurethanes may be obtained by reacting a diol initiator, e.g., 1,3-propanediol or ethylene or propylene glycol, with a lactone or alkylene oxide chain-extension reagent. Lactones that can be ring opened by an active hydrogen are well-known in the art. Examples of suitable lactones include, without limitation, $\epsilon$-caprolactone, $\gamma$-caprolactone, $\beta$-butyrolactone, $\beta$-propriolactone, $\gamma$-butyrolactone, $\alpha$-methyl-$\gamma$-butyrolactone, $\beta$-methyl-$\gamma$-butyrolactone, $\gamma$-valerolactone, $\delta$-valerolactone, $\gamma$-decanolactone, $\delta$-decanolactone, $\gamma$-nonanoic lactone, $\gamma$-octanoic lactone, and combinations of these. In one preferred embodiment, the lactone is $\epsilon$-caprolactone. Useful catalysts include those mentioned above for polyester synthesis. Alternatively, the reaction can be initiated by forming a sodium salt of the hydroxyl group on the molecules that will react with the lactone ring.

In other embodiments, a diol initiator may be reacted with an oxirane-containing compound to produce a polyether diol to be used in the polyurethane elastomer polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG).

Aliphatic polycarbonate diols that may be used in making a thermoplastic polyurethane elastomer are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In various embodiments, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D-4274.

The reaction of the polyisocyanate, polymeric diol, and diol or other chain extension agent is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts. Generally, for elastomeric polyurethanes, the ratio of polymeric diol, such as polyester diol, to extender can be varied within a relatively wide range depending largely on the desired hardness of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 1:1 to 1:1.05, and more preferably, 1:1 to 1:1.02. The polymeric diol segments typically are from about 35% to about 65% by weight of the polyurethane polymer, and preferably from about 35% to about 50% by weight of the polyurethane polymer.

The selection of diisocyanate, extenders, polymeric diols, and the weight percent of the polymeric diols used takes into account the desired density and stability of the finished foam. In general, a greater content of a polymeric polyol that has a Hildenbrand solubility parameter closer to that of the supercritical fluid will permit higher absorption of the supercritical fluid that results in a lower density foam. Also in general, shorter polymeric diols provide foams that shrink less after they are first foamed. Use of higher number average molecular weight polymeric diols allow a higher degree of swelling, but a molecular weight that is too high may yield a less stable foam.

Suitable thermoplastic polyurea elastomers may be prepared by reaction of one or more polymeric diamines or polyols with one or more of the polyisocyanates already mentioned and one or more diamine extenders. Nonlimiting examples of suitable diamine extenders include ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether, 1-methyl-2,6-diamino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene) diamines, and poly(tetramethylene ether) diamines. The amine- and hydroxyl-functional extenders already mentioned may be used as well. Generally, as before, trifunctional reactants are limited and may be used in conjunction with monofunctional reactants to prevent crosslinking.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180° C. to about 300° C. Specific examples of suitable polyamide blocks include NYLON 6, NYLON 66, NYLON 610, NYLON 11, NYLON 12, copolymerized NYLON, NYLON MXD6, and NYLON 46.

The effects of the type and molecular weights of the soft segment polymeric polyols used in making thermoplastic polyurea elastomers and polyamide elastomers are analogous to the same effects in making thermoplastic polyurethane elastomers.

Thermoplastic polyester elastomers have blocks of monomer units with low chain length that form the crystalline regions and blocks of softening segments with monomer units having relatively higher chain lengths. Thermoplastic polyester elastomers are commercially available under the tradename HYTREL from DuPont.

Metallocene-catalyzed block copolymers of ethylene and α-olefins having 4 to about 8 carbon atoms are prepared by single-site metallocene catalysis of ethylene with a softening comonomer such as hexane-1 or octene-1, for example in a high pressure process in the presence of a catalyst system comprising a cyclopentadienyl-transition metal compound and an alumoxane. Octene-1 is a preferred comonomer to use. These materials are commercially available from ExxonMobil under the tradename Exact™ and from the Dow Chemical Company under the tradename Engage™.

Styrene block copolymer elastomers such as poly(styrene-butadiene-styrene), poly(styrene-ethylene-co-butylene-styrene), and poly(styrene-isoprene-styrene) may be prepared may anionic polymerization in which the polymer segments are produced sequentially, first by reaction of an alkyl-lithium initiator with styrene, then continuing polymerization by adding the alkene monomer, then completing polymerization by again adding styrene. S-EB-S and S-EP-S block copolymers are produced by hydrogenation of S-B-S and S-I-S block copolymers, respectively.

The thermoplastic elastomers may be formed into a pellet, bead, particle, cylinder, prolate obloid, cube, spheres, pyramids, tape, ribbon, rope, film, strand, or fiber by known methods, such as extrusion through an appropriately shaped die, cooling, and cutting, or other common forming methods such as compression molding, casting, thermoforming, injection molding, blow molding, or transfer compression molding. Any article made by any of these processes, or optionally post-processed or subjected to ultrasonic RF welding or thermal welding before being foamed in the disclosed foaming process. In various embodiments, the article is a preform. The article may also be a tape, strand, fiber, or other article that is relatively long compared to its other dimensions, which may be laid up before being infused with the supercritical fluid, then foamed.

Thermoplastic elastomer articles of a desired shape are infused, preferably to saturation, with a supercritical fluid, which in many embodiments is preferably supercritical carbon dioxide.

Nonlimiting examples of suitable compounds that can be used as the supercritical fluid include carbon dioxide (critical temperature 31.1° C., critical pressure 7.38 MPa), nitrous oxide (critical temperature 36.5° C., critical pressure 7.24 MPa), ethane (critical temperature 32.3° C., critical pressure 4.88 MPa), ethylene (critical temperature 9.3° C., critical pressure 5.12 MPa), nitrogen (critical temperature −147° C., critical pressure 3.39 MPa), and oxygen (critical temperature −118.6° C., critical pressure 5.08 MPa).

Carbon dioxide is often used as a supercritical fluid in different processes. The supercritical carbon dioxide fluid can be made more compatible with the polar thermoplastic elastomers (particularly thermoplastic polyurethane, polyurea, and polyamide elastomers) by mixing it with a polar fluid such as methanol, ethanol, propanol, or isopropanol. The polar fluid that is used should have a Hildebrand solubility parameter equal to or greater than 9 $MPa^{-1/2}$. Increasing the weight fraction of the polar fluid increases the amount of carbon dioxide uptake, but the polar fluid is also taken up, and at some point there is a shift from a maximum amount of uptake of the supercritical carbon dioxide to an increasing amount of the non-foaming agent polar fluid being taken up by the thermoplastic elastomer article. In certain embodiments, from about 0.1 mole % to about 7 mole % of the polar fluid is included in the supercritical fluid, based on total fluid, especially when used to infuse a polyurethane elastomer, polyurea elastomer, or a polyamide elastomer.

Supercritical fluids may be used in combination. In some cases, supercritical nitrogen may be used as a nucleating agent in a small weight percentage along with supercritical carbon dioxide or another supercritical fluid that acts as the blowing agent. Nano-sized particles such as nano clays, carbon black, crystalline, immiscible polymers, and inorganic crystals such as salts can be included as nucleating agents.

The articles are placed in a vessel that can withstand high pressure. The vessel is closed and $CO_2$ or other type of foaming agent is introduced. The vessel temperature and pressure are maintained above the critical temperature and pressure of the foaming agent. Once the article is saturated with the foaming agent, the vessel is rapidly depressurized (the depressurizing process can last up to a minute or so). The article is then removed from the vessel and heated to produce the foamed part. When a co-solvent is used, it can be introduced along with the $CO_2$ or added to the vessel with the article before the vessel is closed.

The thermoplastic article is soaked in the supercritical fluid under conditions—temperature and pressure—and for a time to allow it to take up a desired amount of the supercritical fluid.

In various embodiments, the thermoplastic article is soaked under conditions that result in it becoming saturated with the supercritical fluid. The article is then removed from the chamber and immediately either heated to a temperature in a medium with suitable thermal characteristics for foaming to occur or is exposed to microwaves or infrared radiation in a tunnel or oven to cause the foaming to occur.

In microwave heating, the material is exposed to an electromagnetic wave that causes the molecules in the material to oscillate, thereby generating heat. The system can be designed to work in batch or continuous process. In a batch process, the articles saturated with the supercritical fluid are placed in a microwave oven or a device equipped with an IR lamp or IR lamps. Preferably the articles are rotated or agitated, when their size is small enough, to ensure fast and uniform heating. When foaming is completed, the articles are removed from the system. The heating can also be done in the continuous process. The articles are placed on a planar surface such as a belt that moves them through a tunnel or through a pipe. The system is designed so that the heating elements (IR lamp or microwave generator) can apply power to achieve rapid uniform heating. The time of heating is controlled by the speed by which the articles move through the tunnel or pipe.

Water is one suitable medium in which foaming readily occurs at an appropriate temperature because water has a high heat capacity and heat transfer rate. In certain preferred embodiments, the thermoplastic elastomer article infused or saturated with supercritical fluid is submerged in water that is at a temperature at least about 80° higher and, preferably, at least about 100° higher than the elastomer's (soft segment) $T_g$ but less than the elastomer's (hard segment) $T_m$.

Other suitable mediums are steam or pressurized hot air.

Time, temperature, and pressure in the step of solvating the thermoplastic elastomer article with the supercritical fluid and the depressurization rate, temperature, and medium in the foaming step all affect the degree of foaming achieved. In general, a thicker article must be kept in the supercritical fluid for a longer time to become saturated with the supercritical fluid. A sheet of thermoplastic polyurethane elastomer (made from SP9213, obtained from BASF Corporation) having a thickness of 25 mm was cut to 25 mm×64 mm sample pieces. The samples were soaked in supercritical carbon dioxide under conditions as noted in Table 1. The vessel was then depressurized and the samples were rapidly transferred to a water bath at the temperature indicated in Table 1 for foaming. The percentage growth was calculated as:

(area of the foam sheet-area of the original sample)/area of the original sample The foam sheets were measured three times: fresh out of the water bath, one day later, and one week later. All foams showed some degree of shrinkage in the first 24 hours and very little shrinkage afterwards.

allow the increased modulus to maintain shape once at room temperature and atmospheric pressure.

The article may be annealed at a temperature from above ambient to just below the $T_m$ of the thermoplastic elastomer (which may be determine by the usual appropriate thermal methods, of which differential scanning calorimetry (DSC) may be mentioned) for a time sufficient to stabilize the foam.

In various embodiments, the foamed articles prepared by the disclosed method are further molded or shaped. In one method, the foamed articles are beads, pellets, particles, or similar relatively small sizes, which will be generally referred to in the following discussion as 'pellets.' A mold is filled with the foamed pellets and the pellets are molded at an appropriate temperature into a shaped article. The shaped article may be of any dimensions. For example, the molded article may be sized as a cushion or cushioning element that can be included in an article of footwear, for example part of a footwear upper, such as a foam element in a collar or tongue, as an insole, as a midsole or a part of a midsole, or an outsole or a part of an outsole; foam padding in shin guards, shoulder pads, chest protectors, masks, helmets or other headgear, knee protectors, and other protective equipment; an element placed in an article of clothing between textile layers; in clothing, in protective gear such as helmets, chest protectors, and shoulder pads, or may be used for other known padding applications for protection or comfort, especially those for which weight of the padding is a concern; or in furniture or in seats, for example bicycle seats.

In one embodiment, a foamed article, such as a midsole for footwear, is formed by placing desired amount of thermoplastic polyurethane foamed pellets in a compression mold in the shape of the article and the mold is brought to a peak temperature of from about 100° C. to about 180° C. over a period of from about 300 to about 1500 seconds, then cooled to from about 5° C. to about 80° C. over a period of from about 300 to about 1500 seconds within about 30 seconds after the peak temperature is reached. In various embodiments, the thermoplastic polyurethane foam pellets may preferably be generally spherical or ellipsoidal. In the case of non-spherical pellets, for example ellipsoidal beads, the largest major diameter of a cross-section taken perpendicular to the major (longest) axis of the ellipsoid. The foam pellets may preferably have a diameter of from about 0.5 mm to about 1.5 cm. Ellipsoidal pellets may be from about 2 mm to about 20 mm in length and from about 1 to about 20 mm in diameter. Each individual pellet may be, for

| Example | Soak time, minute | Supercritical Fluid Pressure, MPa | Supercritical Fluid Temperature, ° C. | Water Temperature, ° C. | Before thickness, mm | Before length, mm | 1 Week after width, mm | 1 Week after length, mm | Expansion, % |
|---|---|---|---|---|---|---|---|---|---|
| 1 | 10 | 10 | 25 | 50 | 25 | 65 | 32 | 77 | 51 |
| 2 | 10 | 10 | 50 | 90 | 25 | 65 | 33 | 85 | 74 |
| 3 | 1440 | 10 | 50 | 50 | 25 | 65 | 26 | 64 | 2 |
| 4 | 1440 | 10 | 25 | 90 | 25 | 65 | 46 | 114 | 222 |
| 5 | 10 | 50 | 50 | 50 | 25 | 65 | 25 | 65 | 1 |
| 6 | 10 | 50 | 25 | 90 | 25 | 65 | 49 | 121 | 266 |
| 7 | 1440 | 50 | 25 | 50 | 25 | 65 | 28 | 71 | 23 |
| 8 | 1440 | 50 | 50 | 90 | 25 | 65 | 37 | 88 | 102 |

The foamed article may be annealed at an elevated temperature after the foaming process. While not wishing to be bound by theory, it is believed that annealing the article may allow phase segregation of the elastomers that are placed under strain, e.g. the mold, and stress, a partial pressure external to moderate internal pressure equilibration just after rapid foaming. Cooling under balanced forces example, from about 20 to about 45 mg in weight. The foam pellets may have a density of from about 0.01 to about 0.3 g/cm³ and the molded article may have a density from about 0.1 to about 0.45 g/cm³.

A desired amount of the thermoplastic polyurethane foam pellets are placed in the compression mold. The foamed pellets may be placed in the mold when both the mold and the foamed pellets are at a temperature below about 80° C. Preferably, the temperatures of the mold and of the foamed beads are both ambient temperature (about 5-27° C.), although as mentioned the temperatures of each may be higher, up to perhaps 80° C.

The foam pellets may be coated with an adhesive before being placed in the mold. Suitable adhesives include W-104, W-105, W-01, W-01S and SW07 from Henkel. Other adhesives such as WA-1C and WP1-116K from Han Young Industry Company can also be used. In general, these adhesives may be sprayed onto the foamed pellets or otherwise coated onto the foamed pellets.

The mold is brought to a peak temperature that is in the range of up about 110° C. over a period of from about 300 to about 1500 seconds. In general, a longer time may be used for heating a thicker part to mold the part. Thus, a thicker part may be brought to the peak molding temperature over a longer period of time compared to the time in which a thinner part is brought to the peak molding temperature. In various embodiments, the mold is brought to the peak temperature over a period of from about 300 to about 1200 seconds or from about 300 to about 900 seconds. A desired skin thickness may be achieved by selection of the maximum heating temperature within the temperature range. Skin thickness may be selected to alter cushioning and feel of a molded midsole as used in an article of footwear. The skin thickness on a bead may be about 10 micrometers. The skin thickness on a molded part may be at least about 20 micrometers. In various embodiments, the peak temperature is selected to produce a skin thickness of from about 10 to about 200 micrometers.

The mold is then cooled to a temperature of from about 5° C. to about 80° C. over a period of from about 300 to about 1500 seconds. Cooling is typically carried out by moving the mold to the cold side of the compression molding press between two cold plates. In general, a longer time may be used for cooling a thicker part.

In other embodiments, the foamed pellets are molded with a matrix material of an unfoamed thermoplastic elastomer, which may include a blowing agent so that it is foamed during the molding process.

The molded article may be used as an insert in a further molding process, such as in a thermoforming process.

The foregoing description of the embodiments has been provided for purposes of illustration and description. It is not intended to be exhaustive or to limit the invention. Individual elements or features of a particular embodiment are generally not limited to that particular embodiment, but can be used in other embodiments and can be combined in other ways, even if not specifically shown or described. Such variations are included in the invention.

What is claimed is:

1. A midsole made by a method comprising:
infusing a plurality of articles comprising a thermoplastic elastomer with a supercritical fluid, wherein the thermoplastic elastomer is selected from the group consisting of thermoplastic polyurethane elastomers, thermoplastic polyurea elastomers, thermoplastic polyamide elastomers, and combinations thereof;
removing the plurality of articles from the supercritical fluid and either
(i) immersing the plurality of articles in a heated fluid or
(ii) irradiating the plurality of articles with infrared or microwave radiation
to make a plurality of foamed articles;
then annealing the foamed articles;
wherein the plurality of foamed articles are selected from pellets, beads, and particles and wherein the plurality of foamed articles are molded together to form the midsole.

2. The midsole according to claim 1, wherein the thermoplastic elastomer comprises a thermoplastic polyurethane elastomer.

3. The midsole according to claim 1, wherein the plurality of articles have at least one dimension that is 10 mm or less.

4. The midsole according to claim 1, wherein the plurality of articles are saturated with the supercritical fluid.

5. The midsole according to claim 1, wherein the supercritical fluid comprises carbon dioxide.

6. The midsole according to claim 1, wherein the supercritical fluid comprises nitrogen.

7. The midsole according to claim 1, wherein the supercritical fluid comprises a polar fluid having a Hildebrand solubility parameter equal to or greater than 9 $MPa^{-1/2}$.

8. The midsole according to claim 1, wherein the plurality of articles are immersed in a heated fluid after being removed from the supercritical fluid to cause the articles to foam, the fluid being at a temperature that is at least about 80° higher than the elastomer's $T_g$ but less than the elastomer's $T_m$.

9. The midsole according to claim 8, wherein the heated fluid is water.

10. The midsole according to claim 1, wherein the plurality of articles are heated with microwaves or infrared radiation after being removed from the supercritical fluid to cause the articles to foam.

11. A midsole made by a method comprising:
infusing a plurality of articles comprising a thermoplastic elastomer with a supercritical fluid;
removing the plurality of articles from the supercritical fluid and either
(i) immersing the plurality of articles in a heated fluid or
(ii) irradiating the plurality of articles with infrared or microwave radiation
to make a plurality of foamed articles;
wherein the plurality of foamed articles are selected from pellets, beads, and particles and wherein the plurality of foamed articles are molded together to form the midsole, wherein the method further comprises annealing the plurality of foamed articles at a temperature below the elastomer's $T_m$.

12. The midsole according to claim 11, wherein the plurality of foamed articles are annealed before being molded together to form the midsole.

13. The midsole according to claim 1, wherein the plurality of foamed articles are coated with an adhesive before being molded together.

14. The midsole according to claim 1, wherein the plurality of foamed articles have a density from about 0.01 to about 0.3 g/cm$^3$.

15. A midsole made by a method comprising:
infusing a plurality of articles comprising a thermoplastic elastomer with a supercritical fluid;
removing the plurality of articles from the supercritical fluid and either
(i) immersing the plurality of articles in a heated fluid or
(ii) irradiating the plurality of articles with infrared or microwave radiation
to make a plurality of foamed articles;
then annealing the foamed articles;

wherein the plurality of foamed articles are selected from pellets, beads, and particles and wherein the plurality of foamed articles are molded together to form the midsole, wherein the plurality of foamed articles are molded together in a matrix of unfoamed thermoplastic elastomer.

16. A midsole made by a method comprising:

infusing a plurality of articles comprising a thermoplastic elastomer with a supercritical fluid;

removing the plurality of articles from the supercritical fluid and either
- (i) immersing the plurality of articles in a heated fluid or
- (ii) irradiating the plurality of articles with infrared or microwave radiation to make a plurality of foamed articles;

then annealing the foamed articles;

wherein the plurality of foamed articles are selected from pellets, beads, and particles and wherein the plurality of foamed articles are molded together to form the midsole, wherein the plurality of foamed articles are molded together in a matrix of foamed thermoplastic elastomer.

17. The midsole according to claim 1, wherein the plurality of foamed articles are spherical or ellipsoidal.

18. The midsole according to claim 17, wherein the plurality of foamed articles have a diameter of from about 0.5 mm to about 1.5 cm.

19. The midsole according to claim 17, wherein the plurality of foamed articles are ellipsoidal and are from 2 mm to 20 mm in length.

* * * * *

UNITED STATES PATENT AND TRADEMARK OFFICE
CERTIFICATE OF CORRECTION

PATENT NO. : 9,802,343 B2
APPLICATION NO. : 15/170701
DATED : October 31, 2017
INVENTOR(S) : Watkins et al.

It is certified that error appears in the above-identified patent and that said Letters Patent is hereby corrected as shown below:

At Column 12, Lines 1-4, in Claim 1, delete
"wherein the plurality of foamed articles are selected from
pellets, beads, and particles and wherein the plurality of
foamed articles are molded together to form the midsole.", and replace with
--wherein the plurality of foamed articles is selected from
pellets, beads, and particles and wherein the plurality of
foamed articles is molded together to form the midsole.--

At Column 12, Line 9, in Claim 3, delete
"of articles have at least one dimension that is 10 mm or less.", and replace with
--of articles has at least one dimension that is 10 mm or less.--

At Column 12, Line 21, in Claim 8, delete
"of articles are immersed in a heated fluid after being", and replace with
--of articles is immersed in a heated fluid after being--

At Column 12, Line 29, in Claim 10, delete
"rality of articles are heated with microwaves or infrared", and replace with
--rality of articles is heated with microwaves or infrared--

At Column 12, Lines 42-44, in Claim 11, delete
"wherein the plurality of foamed articles are selected from
pellets, beads, and particles and wherein the plurality of
foamed articles are molded together to form the mid-", and replace with
--wherein the plurality of foamed articles is selected from
pellets, beads, and particles and wherein the plurality of
foamed articles is molded together to form the mid- --

Signed and Sealed this
Sixth Day of March, 2018

Andrei Iancu
*Director of the United States Patent and Trademark Office*

CERTIFICATE OF CORRECTION (continued)
U.S. Pat. No. 9,802,343 B2

At Column 12, Line 55, in Claim 14, delete
"rality of foamed articles have a density from about 0.01 to", and replace with
--rality of foamed articles has a density from about 0.01 to"--

At Column 13, Lines 1-4, in Claim 15, delete
"wherein the plurality of foamed articles are selected from pellets, beads, and particles and wherein the plurality of foamed articles are molded together to form the midsole, wherein the plurality of foamed articles are", and replace with
--wherein the plurality of foamed articles is selected from pellets, beads, and particles and wherein the plurality of foamed articles are molded together to form the midsole, wherein the plurality of foamed articles is"--

At Column 13, Lines 18-21, in Claim 16, delete
"wherein the plurality of foamed articles are selected from pellets, beads, and particles and wherein the plurality of foamed articles are molded together to form the midsole, wherein the plurality of foamed articles are", and replace with
--wherein the plurality of foamed articles is selected from pellets, beads, and particles and wherein the plurality of foamed articles is molded together to form the midsole, wherein the plurality of foamed articles is--

At Column 13, Line 25, in Claim 17, delete
"rality of foamed articles are spherical or ellipsoidal.", and replace with
--rality of foamed articles is spherical or ellipsoidal.--